United States Patent [19]
Huang et al.

[11] Patent Number: 5,721,957
[45] Date of Patent: Feb. 24, 1998

[54] METHOD AND SYSTEM FOR STORING DATA IN CACHE AND RETRIEVING DATA FROM CACHE IN A SELECTED ONE OF MULTIPLE DATA FORMATS

[75] Inventors: Lawrence P. Huang; David M. Svetlecic, both of Austin, Tex.; Donald A. Evans, Williston; Alan L. Roberts, Jericho, both of Vt.

[73] Assignee: International Business Machines Corporation, Armonk, N.Y.

[21] Appl. No.: 659,045

[22] Filed: Jun. 3, 1996

[51] Int. Cl.$^6$ .................................................. G06F 13/00
[52] U.S. Cl. .................. 395/886; 395/445; 395/456; 395/850; 395/855; 364/DIG. 1
[58] Field of Search .................................. 395/445, 456, 395/850, 855, 886

[56] References Cited

U.S. PATENT DOCUMENTS

| | | | |
|---|---|---|---|
| 4,761,729 | 8/1988 | Brion | 395/886 |
| 5,014,187 | 5/1991 | Debize et al. | 395/886 |
| 5,303,200 | 4/1994 | Elrod et al. | 365/230.05 |
| 5,594,927 | 1/1997 | Lee et al. | 395/886 |
| 5,640,545 | 6/1997 | Baden et al. | 395/515 |

*Primary Examiner*—Frank J. Asta
*Attorney, Agent, or Firm*—Anthony V. S. England; Brain F. Russell; Andrew J. Dillon

[57] ABSTRACT

A method and data processing system are disclosed for storing data in a cache memory and retrieving data from a cache memory in a selected one of multiple data formats. According to the present invention, bits are selected from an L-byte data word to produce N input words, which each have m bits. The N input words are then stored within the cache memory. In response to receipt of a request for data within the L-byte data word having a selected one of the multiple data formats, the N input words are recalled from the cache memory and simultaneously formatted to produce a P-byte formatted data word. Thus, a P-byte formatted data word is efficiently retrieved from the cache memory and formatted according to a selected one of multiple data formats before being utilized in the data processing system.

22 Claims, 14 Drawing Sheets

METHOD AND SYSTEM FOR STORING DATA IN CACHE AND RETRIEVING DATA FROM CACHE IN A SELECTED ONE OF MULTIPLE DATA FORMATS

BACKGROUND OF THE INVENTION

1. Technical Field

The present invention relates in general to a data processing system and in particular to a method and system for storing data in a cache memory and retrieving data from a cache memory in a selected one of multiple data formats.

2. Description of the Related Art

As a processor executes software instructions, the processor may address and recall data from data memory—an area of memory reserved for data used by a software application. Data memory typically includes a cache memory system and a main memory. Cache memory is utilized to store the contents of frequently or recently accessed main memory locations and the addresses where such contents are stored in main memory. Thus, cache memory serves as a buffer between the relatively slow and ever-increasingly large main memory and the processor.

If data requested by the processor is not stored by the cache, a cache "miss" occurs, and the processor is required to retrieve requested data from main memory. When retrieving data from main memory, it is frequently efficient under the principle of locality of reference to fetch not only the requested data, but also additional data, or a block of data, residing in main memory adjacent to the address of the requested data. Such main memory accesses are referred to as a "block fill." Block fill operations typically load an entire cache line, which is the unit of cache memory at which coherency is maintained. On the other hand, if the processor requests data that is resident within cache memory, a cache "hit" occurs, and the requested data is quickly forwarded from the high-speed cache memory to the processor.

Data fetched from the data memory system must often be modified or formatted in order to comply with the data formats utilized by various execution units within the processor. With reference now to FIGS. 1A–1E, there are illustrated several conventional data formatting operations utilized to format data as required by the processor's execution units. As depicted in FIG. 1A, the right justify operation fills the portion of the data word to the left of the most significant bit (msb) with zeros. The sign extend operation illustrated in FIG. 1B fills the portion of the data word to the left of the most significant bit (i.e., the sign bit) with ones or zeros, depending on the state of the sign bit. In a pad string with zeros operation, the portion of the data word to the right of the least significant bit (lsb) is padded with zeros, as illustrated in FIG. 1C. A byte swapping operation reorders the bytes within a data object to convert the data object from big Endian, which stores the most significant byte (MSB) in the lowest address, to little Endian, which stores the least significant byte (LSB) in the lowest address, or from little Endian to big Endian. In the example depicted in FIG. 1D, a byte swapping operation is utilized to convert a data object comprising bytes ABCD from big Endian to little Endian (DCBA). Finally, as illustrated within FIG. 1E, an align data object operation aligns a selected data object with a predetermined boundary. In the depicted example, bytes BCDE, which comprise a data word, are the only bytes of interest within doubleword 20. Accordingly, bytes BCDE are extracted from doubleword 20 and aligned with the boundary of doubleword 22. In addition, doubleword 22 has been right justified by filling the portion of double word 22 to the left of the MSB (byte B) with zeros.

In order to format data in the manner described above, the execution units within a conventional processor, for example, the floating-point execution unit (FPU) and the fixed-point execution unit (FXU), each contain integrated circuitry for formatting data. For example, referring now to FIG. 2, there is depicted a conventional superscalar data processing system having multiple execution units A–D, which retrieve data and instructions from an associated memory system including cache 50 and main memory 52. Upon receiving a data request from one of execution units A–D, the memory system forwards the requested data to the requesting execution unit in the same format that the requested data was stored in cache and main memory, regardless of which data format is required for the requesting execution unit to use the requested data to execute an instruction. Therefore, in the prior art, data formatters 54 are included in each of execution units A–D to process the data into a selected format prior to instruction execution.

The prior art superscalar data processing system architecture depicted in FIG. 2 has at least two problems. First, the inclusion of a formatter within each of execution units A–D increases the access latency of the data path between the memory system and execution units A–D because of the cycle time required to format the data. Second, duplication of the formatter circuitry within each of execution units A–D increases the processor die size and cost. Consequently, it should be apparent that an improved method and system for formatting data within a processor are needed which minimize the formatting circuitry required within the processor and decrease data access latency.

SUMMARY OF THE INVENTION

It is therefore one object of the present invention to provide an improved data processing system.

It is another object of the present invention to provide a method and system for storing data in cache and retrieving data from cache in a selected one of multiple data formats.

The foregoing objects are achieved as is now described. A method and data processing system are disclosed for storing data in a cache memory and retrieving data from a cache memory in a selected one of multiple data formats. According to the present invention, bits are selected from an L-byte data word to produce N input words, which each have m bits. The N input words are then stored within the cache memory. In response to receipt of a request for data within the L-byte data word having a selected one of the multiple data formats, the N input words are recalled from the cache memory and simultaneously formatted to produce a P-byte formatted data word. Thus, a P-byte formatted data word is efficiently retrieved from the cache memory and formatted according to a selected one of multiple data formats before being utilized in the data processing system.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1A:
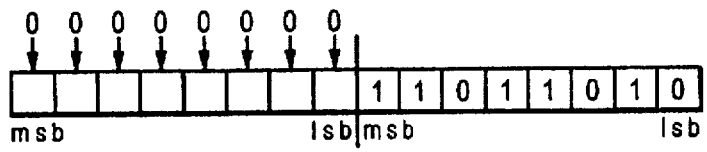
FIGS. 1A–1E illustrate various types of data formatting, which are known in the prior art.
Figure 1B:
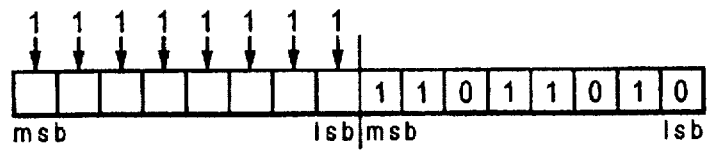
Figure 1C:
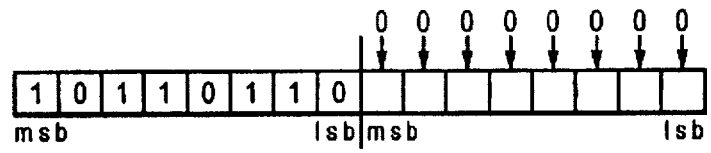
Figure 1D:
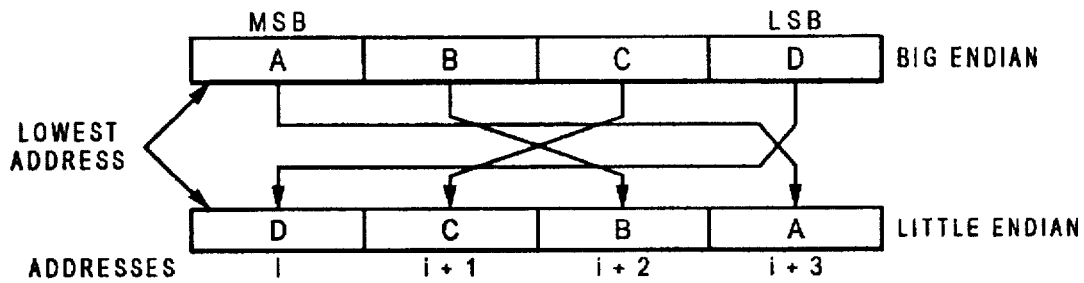
Figure 1E:
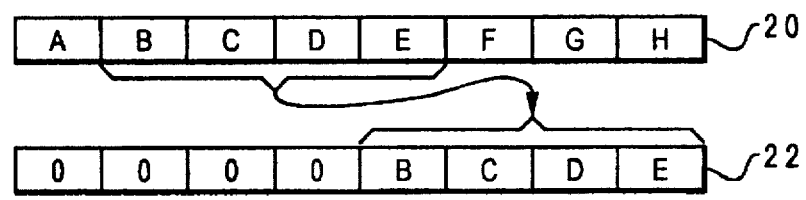
Figure 2:
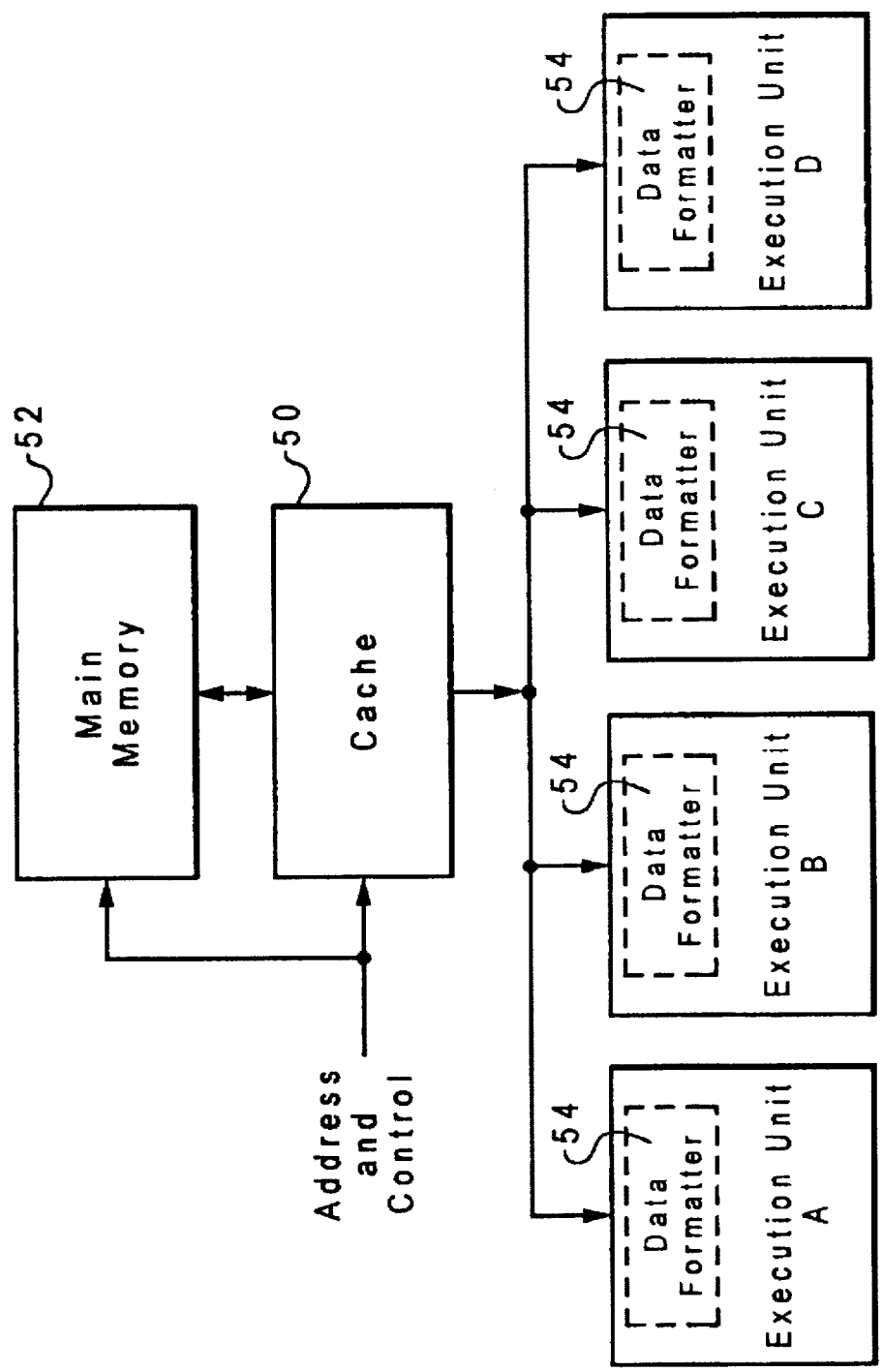
FIG. 2 depicts a portion of a conventional superscalar data processing system that has a data formatter included within each of the data processing system's multiple execution units.
Figure 3:
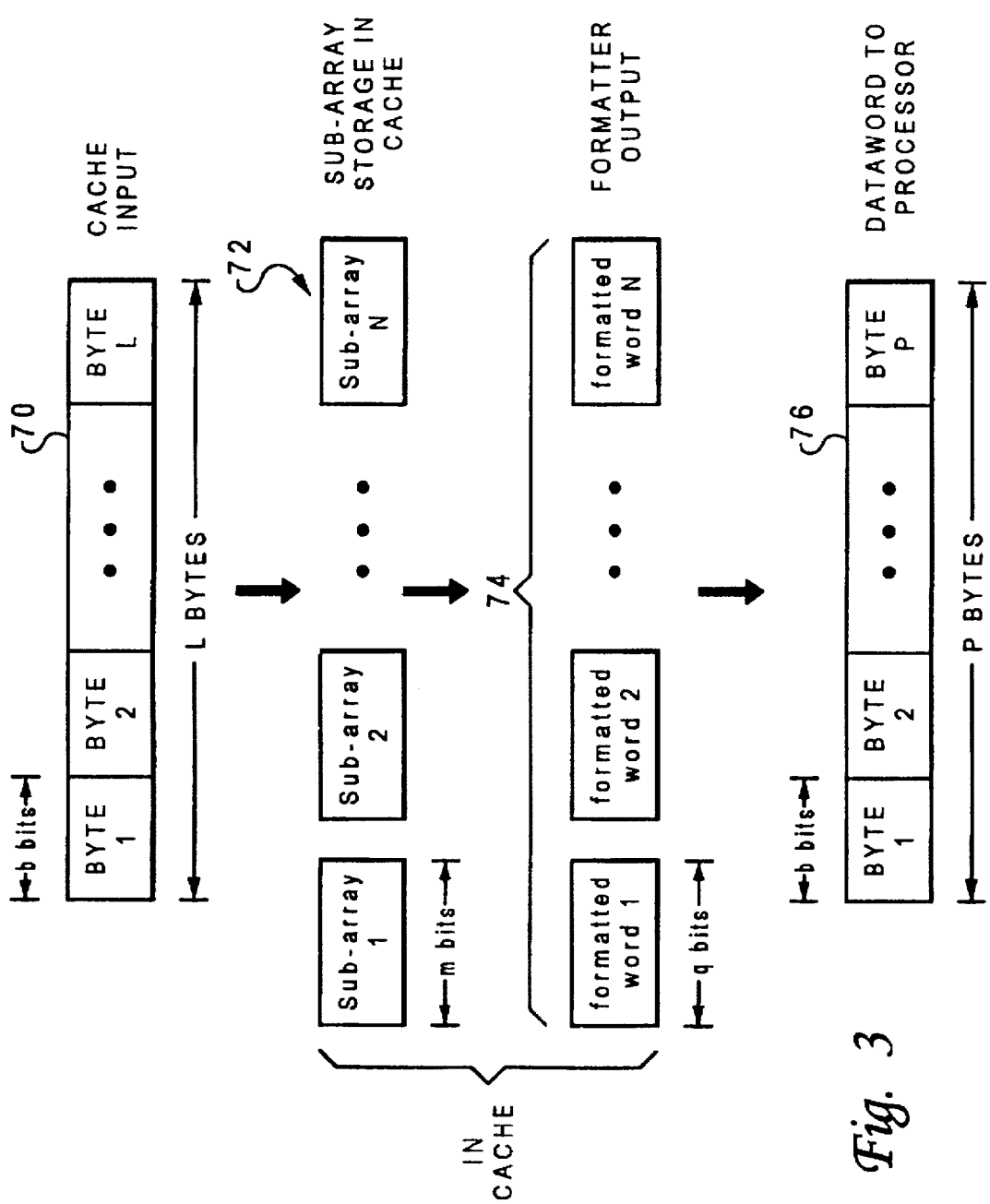
FIG. 3 depicts a conceptual representation of the data formatting performed by the cache system of a data processing system in accordance with the present invention.

With reference now to the figures, and in particular with reference to FIG. 3, there is illustrated a conceptual representation of the data storage and formatting performed within the cache system of a data processing system in accordance with the present invention. As illustrated, a data word 70 comprising L bytes of b bits per byte is received by the cache system. In contrast to conventional cache systems, which typically store the L bytes of data word 70 as a unit (after possibly rearranging the byte order), a cache system employing the present invention stores the (L×b) bits comprising data word 70 within N sub-arrays of m bits each, as illustrated at reference numeral 72. Thus, in accordance with the present invention, L×b=N×m.

When a data request is transmitted to the cache system by a processor, the data request includes information specifying a particular data format for the output data. In response to receiving the data request, data formatters associated with each of the N sub-arrays format the information stored within the N sub-arrays into N formatted words 74, which each include q bits. Thereafter, depending upon the specified data format, particular bits within the N formatted words 74 are selected and ordered to form output data word 76, which comprises P bytes of b bits per byte. Thus, the formatting operations of the cache system are governed by the relationship N×q=P×b. As will be understood by those skilled in the art from the foregoing description, the present invention enables information within an input data word of a first length to be stored within one or more sub-arrays of a cache system and, in response to a data request, to be formatted into an output data word of a second length, which has a selected arbitrary data format.

Figure 4:
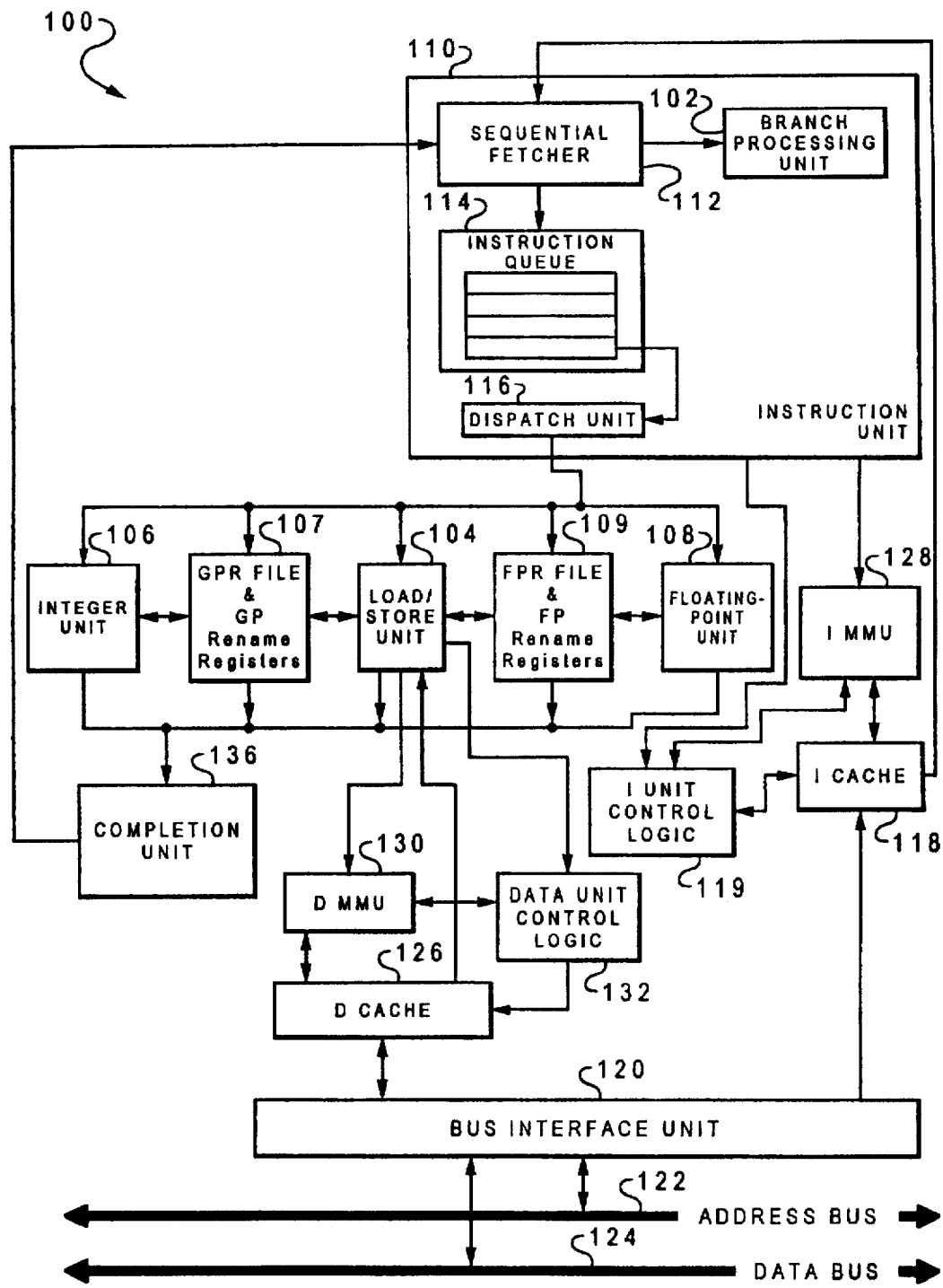
FIG. 4 illustrates a block diagram of a preferred embodiment of a superscalar data processing system in accordance with the method and system of the present invention.

Referring now to FIG. 4, there is illustrated a block diagram of a superscalar data processing system in accordance with the method and system of the present invention. As will be appreciated by those skilled in the art, the conceptual block diagram depicted within FIG. 4 is intended to show the basic features of a preferred embodiment of a superscalar processor that employs the present invention rather than to show how these features are physically implemented on a semiconductor chip.

As a superscalar processor, processor 100 is capable of issuing multiple independent instructions into multiple execution pipelines, allowing multiple instructions to execute in parallel during each processor cycle. Thus, as illustrated in FIG. 4, superscalar processor 100 includes four independent execution units and two register files. The four independent execution units include: branch processing unit (BPU) 102, load/store unit (LSU) 104, integer unit 106, and floating-point unit (FPU) 108. Register files include general purpose register file (GPR) 107, which stores integer operands, and floating-point register file (FPR) 109, which stores single or double-precision floating-point operands. Furthermore, both GPR 107 and FPR 109 include a set of rename registers for temporarily storing data results of instructions until the instructions can be completed by transferring the data results to architected registers within GPR 107 or FPR 109.

Instruction unit 110 contains sequential fetcher 112, instruction queue 114, dispatch unit 116, and branch processing unit 102. Instruction unit 110 determines the address of the next instruction to be fetched based upon information received from sequential fetcher 112 and branch processing unit 102.

Sequential fetcher 112 fetches instructions from instruction cache 118 and loads fetched sequential instructions into instruction queue 114. Branch instructions fetched from instruction cache 118 are identified by sequential fetcher 112 and forwarded to branch processing unit 102 directly, bypassing instruction queue 114. Branch instructions are executed and resolved by BPU 102 if the branch is unconditional or if the required conditions are available. However, if a conditional branch instruction remains unresolved, BPU 102 predicts the outcome of the branch utilizing static branch prediction, thereby permitting sequential fetcher 112 to fetch instructions within a speculative execution path while the conditional branch is evaluated.

As noted above, sequential instructions fetched from instruction cache 118 are loaded into instruction queue 114, which is capable of storing multiple instructions. Sequential fetcher 112 continuously loads instructions from instruction cache 118 under the control of instruction unit control logic 119 in order to keep the space in instruction queue 114 filled. For each instruction request made by instruction unit 110, instruction memory management unit 128 translates the virtual (logical) address contained in the request into a physical address and determines whether a hit or miss of instruction cache 118 has occurred. If while filling instruction queue 114, a request from sequential fetcher 112 misses in instruction cache 118, then arbitration for a memory access will begin. Dispatch unit 116 issues instructions from instruction queue 114 to execution units 104, 106, and 108 in program order. As will be appreciated by those skilled in the art, the instruction dispatch rate of superscalar processor 100 is contingent on numerous factors, including execution unit busy status, rename and completion buffer availability, and the serializing behavior of some instructions.

Completion unit 136 retires executed instructions from a reorder buffer (ROB) in the completion unit and updates control registers and register files 107 and 109. An instruction is retired from the ROB when it has "finished" execution and all instructions ahead of it have been "completed." The instruction's result is written into the appropriate one of register files 107 and 109 and is removed from the rename buffers at or after completion. Several instructions can complete simultaneously. Completion unit 136 also recognizes exception conditions and discards any operations being performed on subsequent instructions in program order.

The data memory system of superscalar processor 100 includes data cache 126, data memory management unit 130, and data unit control logic 132. Data cache 126 stores data for rapid access by LSU 104. In accordance with an important aspect of the present invention, data cache 126 includes facilities to format data requested by LSU 104. As illustrated, data unit control logic 132 is coupled to LSU 104, data memory management unit 130, and data cache 126 in order to receive requests for formatted data from LSU 104 and to control the data formatting performed within data cache 126.

Finally, superscalar processor 100 includes bus interface unit 120, which controls access to the external address bus 122 and data bus 124 by participating in bus arbitration. As will be appreciated by those skilled in the art, a main memory (not illustrated) as well as numerous other devices can be coupled to buses 122 and 124 for interaction with superscalar processor 100. Superscalar processor 100 and the other devices coupled to buses 122 and 124 together comprise a data processing system.

Figure 5:
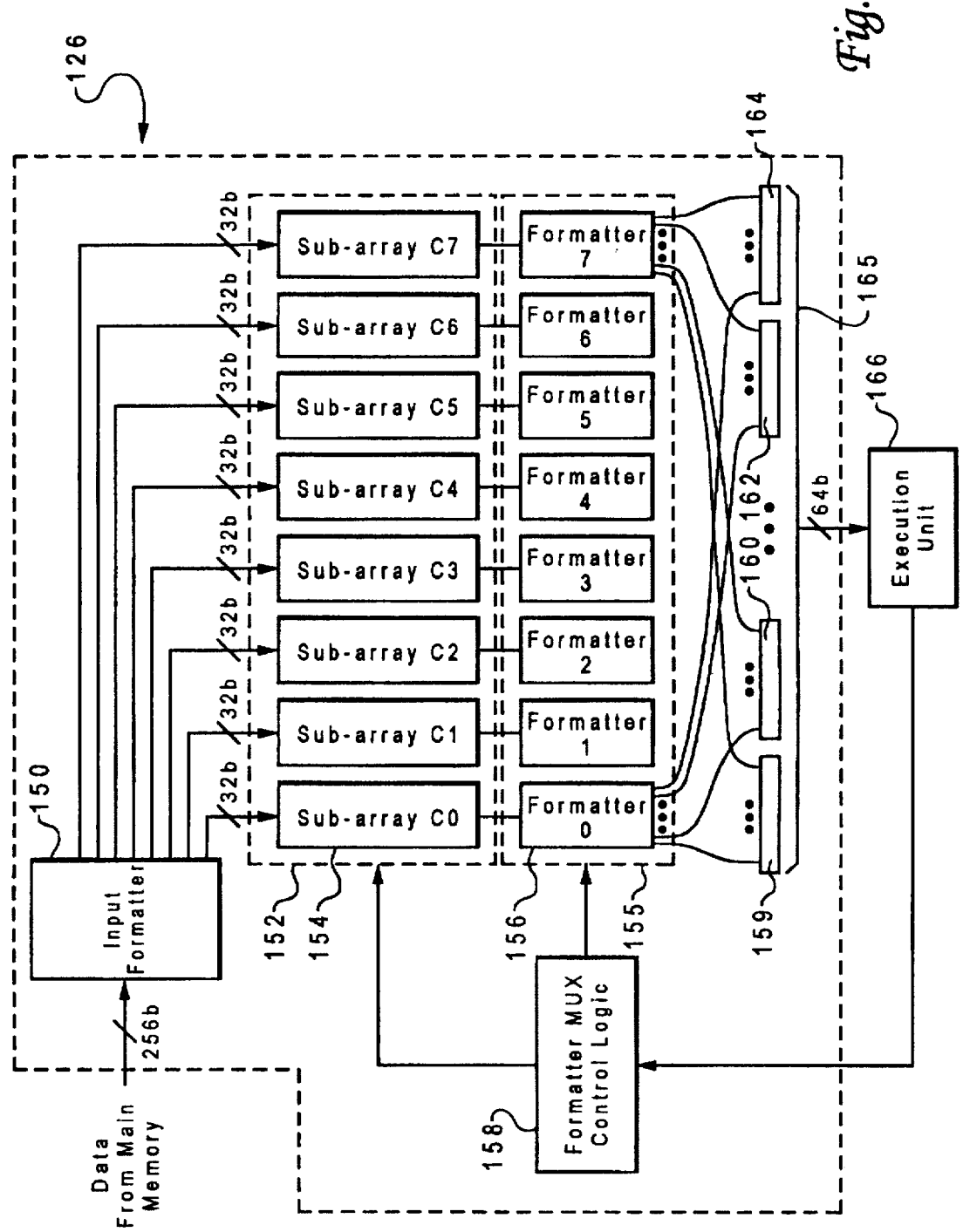
FIG. 5 depicts a preferred embodiment of a cache system of a data processing system in accordance with the method and system of the present invention.

Referring now to FIG. 5, there is depicted a cache system in accordance with the method and system of the present invention. As illustrated, data received by data cache 126 from main memory is input into input formatter 150. In the illustrated embodiment, the bandwidth of data blocks received from main memory is 256 bits, formatted as 32 8-bit bytes (i.e., L=32 and b=8); however, as described above, in other embodiments a greater or lesser numbers of bits may be input into input formatter 150. Input formatter 150 groups data bits within the L-byte data block received from main memory to produce N input words of m bits. That is, according to the embodiment depicted within FIG. 5, input formatter 150 selects bits from the input 32-byte data block to produce 8 32-bit input words (i.e., N=8 and m=32). In one embodiment of the present invention, input word 0 is comprised of bit 0 from each of the 32 bytes in the L-byte data block input into input formatter 150. Similarly, each remaining input word i is comprised of bit i from each of the 32 bytes of the L-byte data word input into input formatter 150. Those skilled in the art will appreciate, however, that numerous other implementations may be utilized to form the input data words. After input formatter 150 has processed the 32-byte input data block into 8 32-bit input words, the 8 32-bit input data words are each stored within one of 8 sub-arrays 154 within memory array 152.

When data cache 126 receives a request from a particular execution unit, illustrated generically at reference numeral 166, for data having a selected data format, the data request is forwarded to formatter MUX control logic 158. Based upon the data request, formatter MUX control logic 158 transmits control signals to memory array 152 to read out the appropriate word from each sub-array 154. In addition, formatter MUX control logic 158 transmits control signals to formatter array 155 to configure the formatter 156 coupled to each sub-array 154. According to an important aspect of the present invention, each of formatters 156 is configured by control signals from formatter MUX control logic 158 in parallel during the time data is being accessed within sub-arrays 154. Thus, formatters 156 are configured to process the data words read out from sub-arrays 154 into the desired data format by the time the data words are available at the input to formatters 156. The operation and structure of formatters 156 is described in greater detail below with reference to FIGS. 6–8.

After the 8 data words read out from sub-arrays 154 have been processed in parallel by formatters 156, a P-byte formatted data word 165 having b bits per byte is produced by selecting data bits from each output word processed by one of formatters 156. In the illustrated embodiment, formatted data word 165 comprises 8 8-bit bytes (P=8, b=8); however, those skilled in the art will appreciate that a cache designer can select any other suitable number of bytes. In the specific embodiment depicted in FIG. 5, bit 0 of the output word generated by formatter 0 is selected as bit 0 of byte 159, which is the first byte of formatted data word 165. Bit 1 of the output word generated by formatter 0 is selected as bit 0 of byte 160, the second byte within formatted data word 165. Similarly, the jth bit of the kth output word is selected as the kth bit of the jth byte of formatted data word 165. Following the formation of formatted data word 165, formatted data word 165 is transmitted to requesting execution unit 166, which can immediately utilize formatted data word 165 in executing an instruction without further processing.

Figure 6:
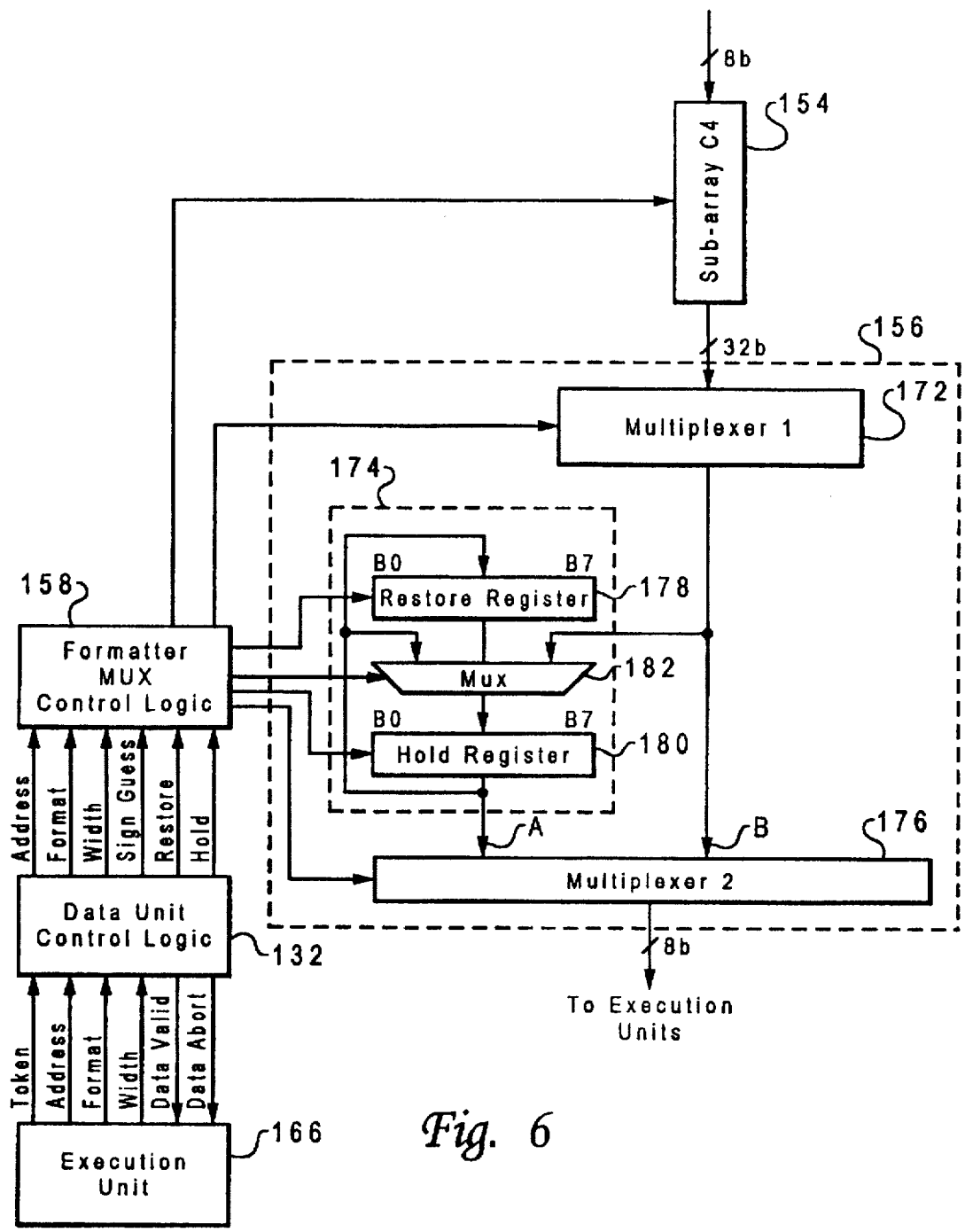
FIG. 6 illustrates a more detailed block diagram of one of the formatters depicted in FIG. 6 and the interconnection between the formatter and other circuitry within the processor.

With reference now to FIG. 6, there is depicted a more detailed block diagram of one of formatters 156 illustrated in FIG. 5 and the interconnection between the formatter 156 and other circuitry within processor 100 according to the method and system of the present invention. As illustrated, execution unit 166 is coupled to data unit control logic 132 by various control signals utilized to transmit data requests. Each data request specifies the address, data width, and format of the requested data. Data unit control logic 132, which provides an interface between execution unit 166 and formatter MUX control logic 158, transmits the information within the data request and additional control information to formatter MUX control logic 158. As illustrated, formatter MUX control logic 158 is coupled by control signals to each sub-array 154 within memory array 152 and each formatter 156. Utilizing information received from data unit control logic 132, formatter MUX control logic 158 provides the address signals necessary to retrieve the requested data from sub-array 154 and configures the data formatting logic within formatter 156.

Formatter 156 includes multiplexer-1 172, storage means 174, and multiplexer-2 176. Multiplexer-1 172, which receives control signals from formatter MUX control logic 158, is utilized to move any bit within the 32-bit data word read out from sub-array 154 to any bit location within the 8-bit data word output from formatter 156, without duplicating a bit from one bit location to more than one other bit location. Therefore, bits in the 32-bit data word read out from sub-array 154 may be reordered in any order within multiplexer-1 172 under the control of formatter MUX control logic 158.

The output of multiplexer-1 172 is coupled to both storage means 174 and multiplexer-2 176. Storage means 174 provides a storage location in which one or more data words may be temporarily stored under the control of formatter MUX control logic 158. As illustrated, storage means 174 includes restore register 178, hold register 180, and multiplexer 182. Multiplexer 182 selects a data word from the data words input from hold register 180, restore register 178, or multiplexer-1 172. Multiplexer-2 176, which is controlled by formatter MUX control logic 158, provides an 8-bit output in which each bit is selected from any bits received from multiplexer-1 172 or storage means 174, or is forced to a "1" or a "0" independently from any other bit within the 8-bit output.

Figure 7:
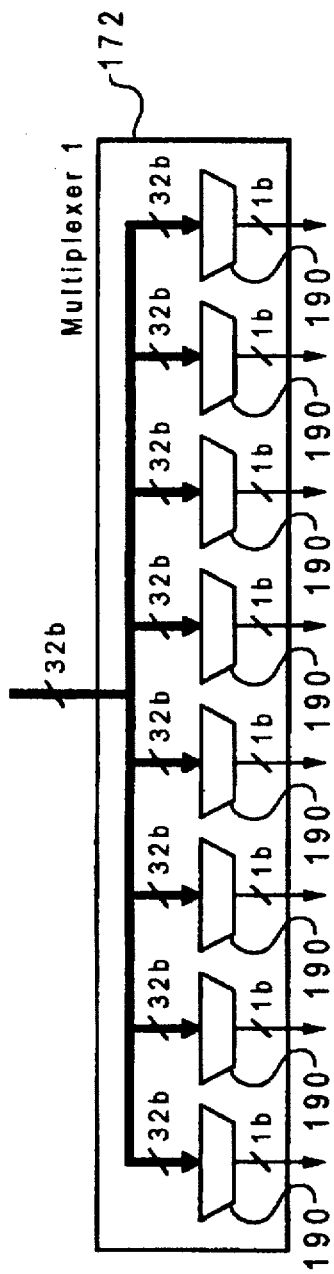
FIG. 7 depicts a more detailed block diagram of multiplexer-1 of FIG. 6 in accordance with the method and system of the present invention.

Referring now to FIG. 7, there is depicted a more detailed block diagram of multiplexer-1 of FIG. 6 in accordance with the method and system of the present invention. As illustrated, 32 bits are input into each of 8 multiplexers 190, which each independently select one of the 32 input bits. Typically, any particular one of the 32 input bits is selected by only one multiplexer 190.

Figure 8:
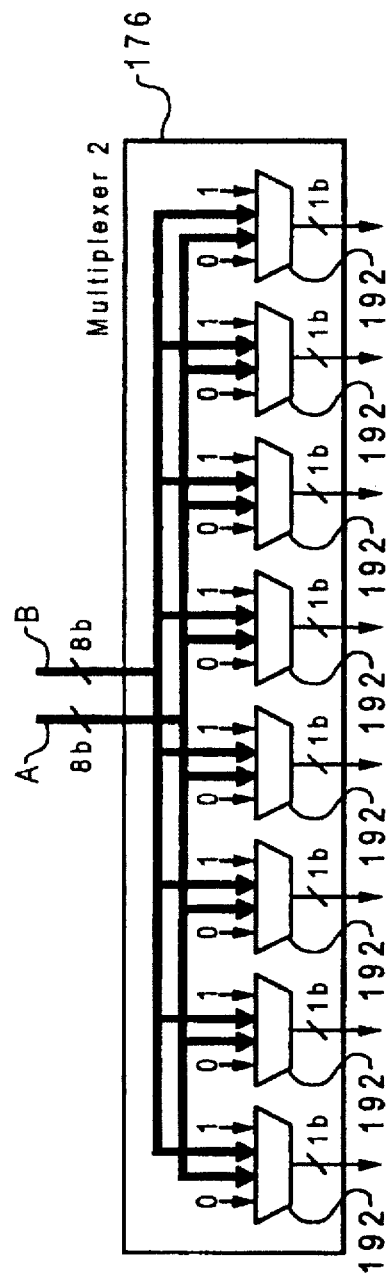
FIG. 8 illustrates a more detailed block diagram of multiplexer-2 depicted in FIG. 6 in accordance with the method and system of the present invention.

With reference now to FIG. 8, detailed illustrated a more detailed block diagram of multiplexer-2 of FIG. 6 in accordance with the method and system of the present invention. As illustrated, multiplexer-2 176 includes 8 multiplexers 192, which each select a single bit from among 18 input bits. The 18 input bits of each of multiplexers 192 include a logical 0, a logical 1, an 8-bit A input, and an 8-bit B input. Accordingly, each bit within the 8-bit output of multiplexer-2 176 may be a 0, a 1, any bit selected from input A, or any bit selected from input B.

Figure 9:
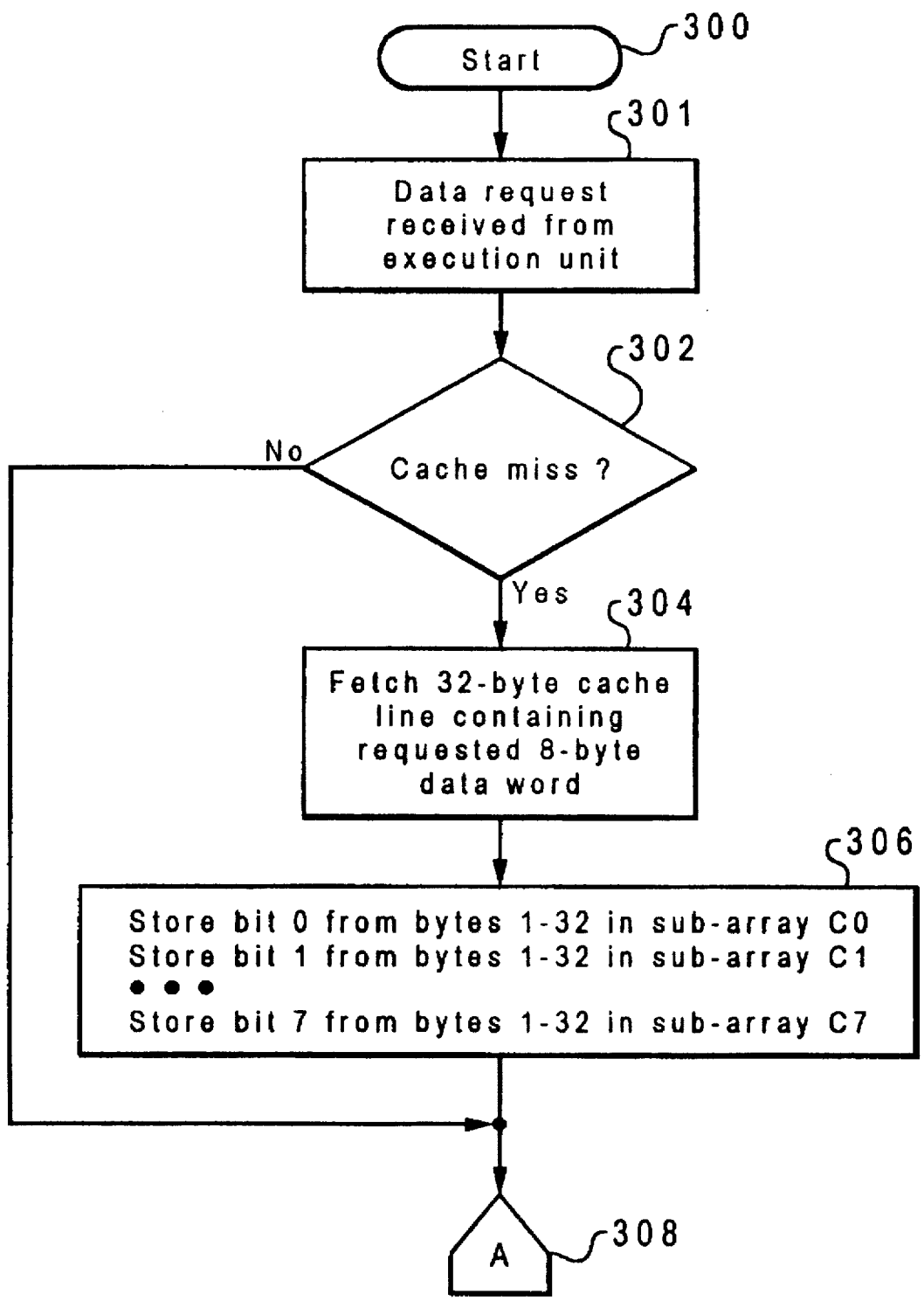
FIG. 9 is a high-level flowchart depicting a method of storing data in a cache having an input formatter in accordance with the method and system of the present invention.

With reference now to the flowcharts, and more specifically with reference to FIG. 9, there is depicted a high-level flowchart depicting the process of storing data in a cache system having an input formatter in accordance with the method and system of the present invention. As depicted, the process begins at block 300 and thereafter proceeds to block 301, which illustrates the data cache 126 receiving a data request from execution unit 166. In the data processing system depicted in FIG. 4, requests from execution units, such as integer unit 106 or FPU 108 are received by data unit control logic 132 via LSU 104. Each data request includes an address, a selected data format, a data width, and a token which is used to coordinate data retrieved from cache with a particular data request. The process then passes to block 302, which illustrates a determination of whether or not a cache "miss" has occurred. If a cache miss has not occurred (i.e., a cache hit has occurred), the process passes to FIG. 10 via off-page connector A 308. However, if a cache miss has occurred, the process proceeds to block 304, which depicts data cache 126 fetching a 32-byte block from main memory that includes the requested 8-byte data word.

After the 32-byte block containing the requested 8-byte data word has been fetched from main memory, the data within the 32-byte block is stored in memory array 152 according to a selected input format. In the example illustrated in FIG. 9, bit 0 from each of bytes 1–32 are concatenated to form an input word which is stored in sub-array C0, as illustrated at block 306. In a similar manner, the input word stored in sub-array Ci is formed by concatenating bit i from each of the 32 bytes within the fetched data block. Thus, sub-arrays C0-C7 are loaded with input words which are formed by formatting a 32-byte data block retrieved from main memory. Thereafter, the process passes through off-page connector A 308 to FIG. 10, as has been described.

Figure 10:
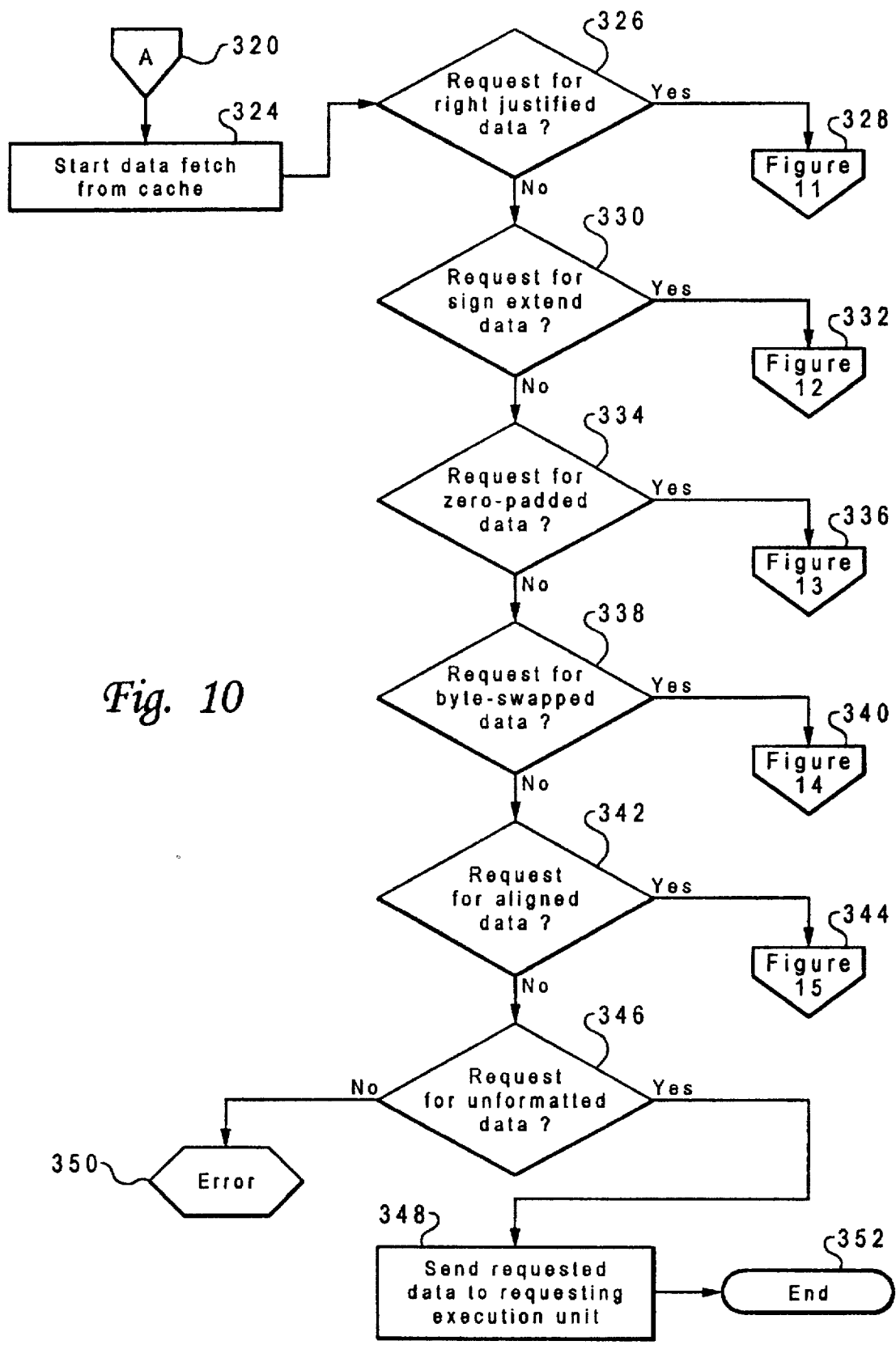
FIGS. 10–15 are flowcharts that illustrate the process of retrieving data from a cache in a selected one of multiple data formats according to the method and system of the present invention.

Referring now to FIG. 10, there is depicted a method for retrieving data from cache in a selected one of multiple formats according to the method and system of the present invention. As illustrated, the process begins at on-page connector A 320, and thereafter passes to block 324, which depicts the initiation of a data fetch from data cache 126. According to an important aspect of the present invention, memory array 152 within data cache 126 begins to access the requested data while formatter array 155 is being configured to format the data into the selected data format. As will be appreciated by those skilled in the art, the initiation of the data fetch entails the decoding of the word line within memory array 152 that stores the requested data and the evaluation of the states of the bit lines.

Following the initiation of a data fetch from data cache 126 at block 324, the process passes to blocks 326, 330, 334, 338, 342, and 346, which illustrate determining which one of a number of available data formats has been requested by execution unit 166. As depicted at block 326, a determination is made whether or not right justified data has been requested. If right justified data has been requested, the process passes to FIG. 11 via off-page connector 328. If not, the process proceeds to block 330, which illustrates a determination of whether or not sign extended data has been requested. If sign extended data has been requested, the process passes to FIG. 12 via off-page connector 332. If not, the process proceeds to block 334, which depicts a determination whether or not zero-padded data has been requested. If zero-padded data has been requested, the process passes to FIG. 13 via off-page connector 336. If not, the process proceeds to block 338, which illustrates a determination of whether or not byte-swapped data has been requested. If byte-swapped data has been requested, the process passes to FIG. 14 via off-page connector 340. If not, the process proceeds to block 342. Block 342 depicts a determination of whether or not aligned data has been requested. If aligned data has been requested, the process passes to FIG. 15 via off-page connector 344. If not, the process proceeds to block 346, which illustrates a determination of whether or not unformatted data has been requested. If not, the data request does not specify a recognizable data format and an appropriate error routine is executed, as illustrated at block 350. However, if unformatted data has been requested, the process sends the requested data to execution unit 166, as illustrated at block 348. It is important to note that even unformatted data must be reassembled into the data word originally retrieved from main memory and stored in cache, as illustrated by the selection of bits to form bytes 159–164 in FIG. 5. After sending the requested data to execution unit 166, the process passes to block 352 and terminates.

Figure 11:
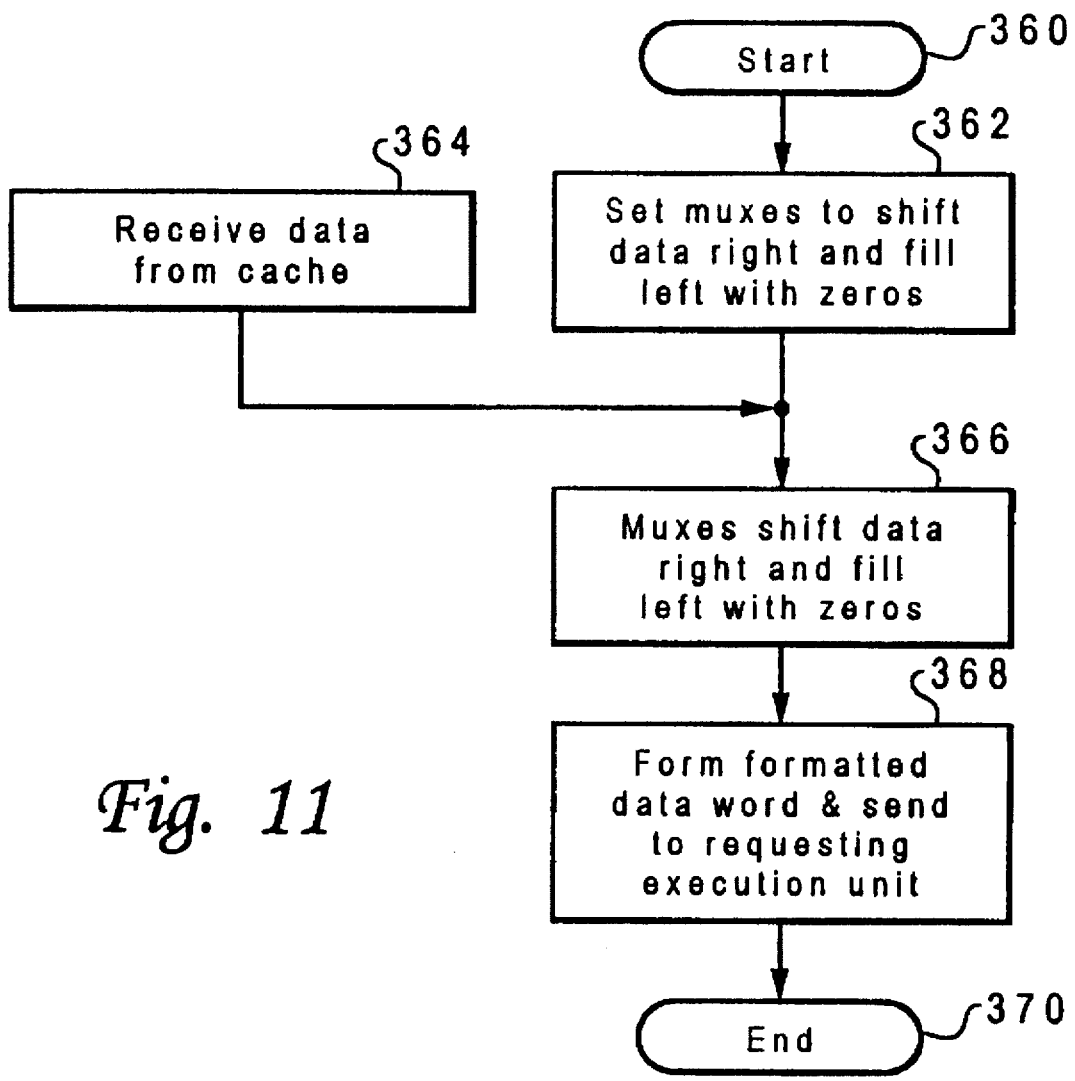

With reference now to FIG. 11, there is illustrated a flowchart of a method for formatting data in a right justified format in accordance with the method and system of the present invention. The process begins at block 360 and thereafter passes to block 362, which depicts configuring multiplexer-1 172 and multiplexer-2 176 within formatters 156 to select the requested bits from the data words read out from memory array 152 and fill the bits to the left of the most significant bit (msb) with zeros. As illustrated at block 364, while formatter array 155 is being configured, data is accessed within memory array 152. Once data is received by formatter array 155 from memory array 152, formatters 156 select the appropriate bits from the data words read out from memory array 152 to form an 8-byte output data word and fill the portion of the output data word to the left of the msb with zeros, as depicted at block 366. Next, as depicted at block 368, an 8-byte formatted data word 165 is formed from bits within the 8-byte output data word and sent to execution unit 166. Thereafter, the process terminates at block 370.

Figure 12:
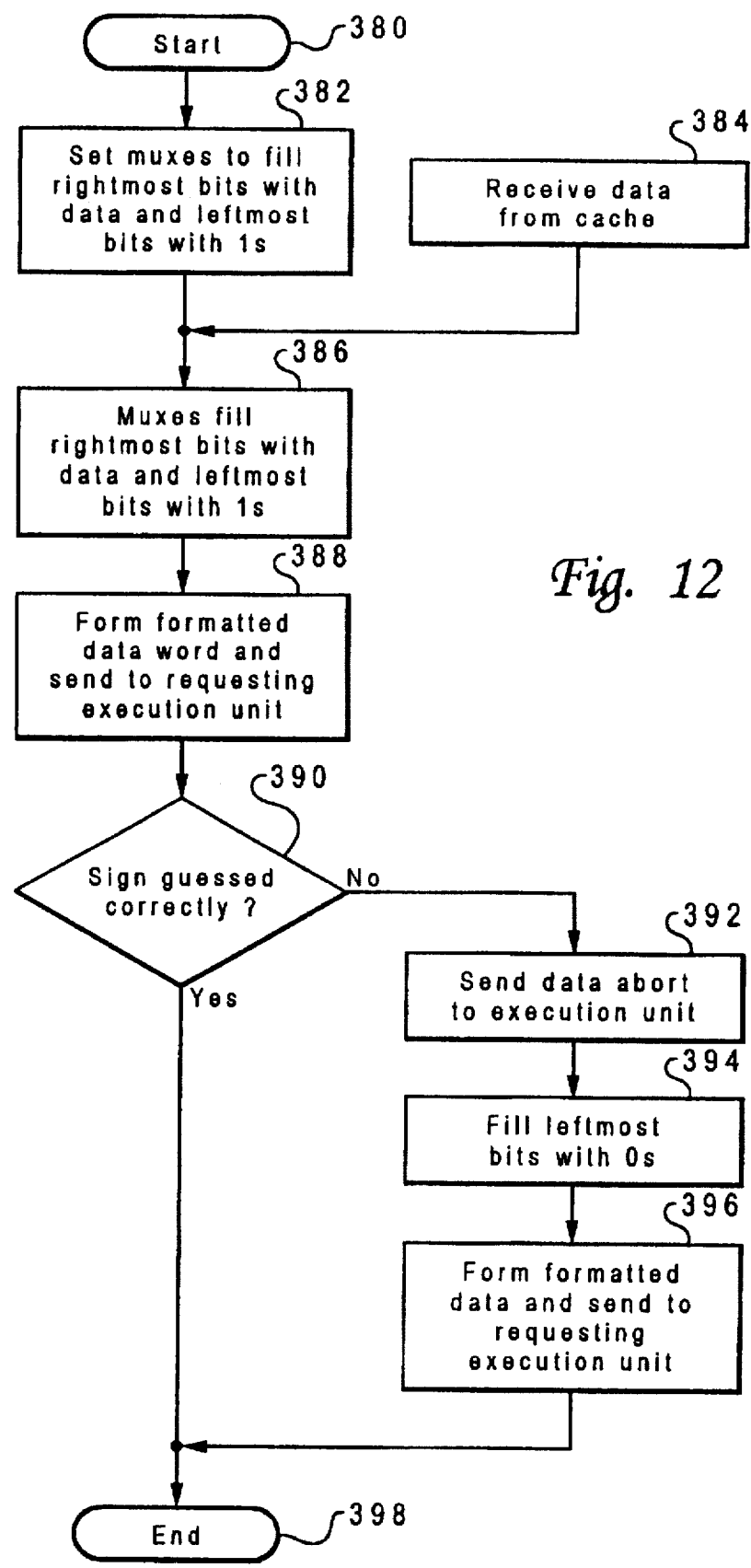

Referring now to FIG. 12, there is depicted a flowchart of a method for recalling data from cache in a sign-extended data format in accordance with the method and system of the present invention. As depicted, the process begins at block 380 and thereafter passes to block 382, which illustrates configuring multiplexers 172 and 176 within formatters 156 to fill the rightmost bit positions of the 8-byte output data word with the requested bits from the data words read out from memory array 152 and to fill the bits to the left of the sign bit of the requested data with 1 s. As illustrated at block 384, the requested data is accessed within memory array 152 during the configuration of formatter array 155 in order to minimize latency. Next, the process proceeds to block 386, which depicts formatter array 155 selecting the appropriate bits from the data read out from memory array 152 to form an 8-byte output data word that is filled to the left of the msb with 1s. The process proceeds to block 388, which depicts the formation of an 8-byte formatted data word 165 from bits within the 8-byte output data word. Formatted data word 165 is then sent to execution unit 166.

After sending formatted data word 165 to execution unit 166, a determination is made at block 390 whether or not the sign was guessed correctly. If so, the process proceeds directly to block 398 and terminates. If the sign was not guessed correctly (i.e., the requested data had a positive value), the process proceeds to blocks 392, which depicts data cache 392 transmitting a data abort signal to execution unit 166. The process the passes to block 394, which illustrates formatter array 155 selecting the appropriate bits to fill the bits to the left of the msb with zeros. Formatted data word 165 is then reformed and resent to execution unit 166, as depicted at block 396. Thereafter, the process terminates at block 398.

Because formatter array 155 is configured during access of the requested data within memory array 152, data can typically be accessed within memory array 152, formatted within formatter array 155, and returned to the requesting execution unit 166 within a single processor cycle. However, in the embodiment of the method for recalling sign-extended data from cache illustrated within FIG. 12, an additional cycle is required if the sign is guessed incorrectly in order to reformat and resend the requested data. In that case, the data is held during the additional cycle within hold register 180. Typically, hold register 180 receives new data from multiplexer 176 during each cycle. However, if a need arises to recall the previous contents of hold register 180, the contents of restore register 178, which contains the previous contents of hold register 180, are passed to hold register 180 through multiplexer 182.

Figure 13:
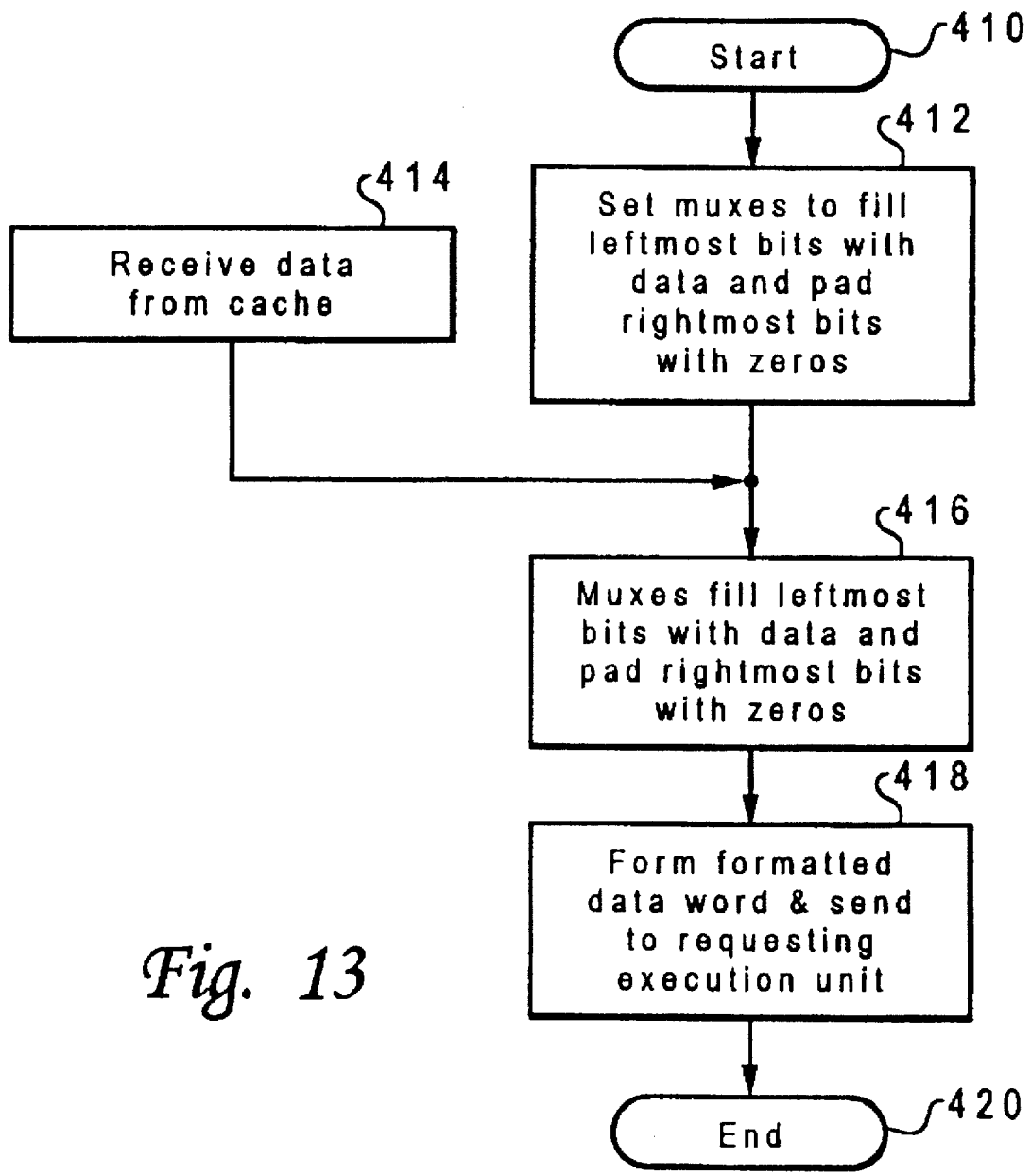

With reference now to FIG. 13, there is illustrated a flowchart of a method in accordance with the present invention for recalling data from cache in a format having the least significant bits (lsb) padded with zeros. As depicted, the process begins at block 410 and thereafter passes to block 412, which illustrates configuring multiplexers 172 and 176 within formatters 156 to fill the leftmost bit positions of the 8-byte output data word the requested data and to pad the portion of the output data word to the right of the lsb of the requested data with zeros. As illustrated at block 414, the requested data is recalled from memory array 152 while formatter array 155 is configured. Meanwhile, the process proceeds from block 412 to block 416, which depicts multiplexers 172 and 176 filling the leftmost bits of the 8-byte output data word with the requested data and padding the bits to the right of the lsb of the requested data with zeros once the requested data has been received from memory array 152. Next, formatted data word 165 is formed and sent to execution unit 166, as illustrated at block 418. Thereafter, the process terminates at block 420.

Figure 14:
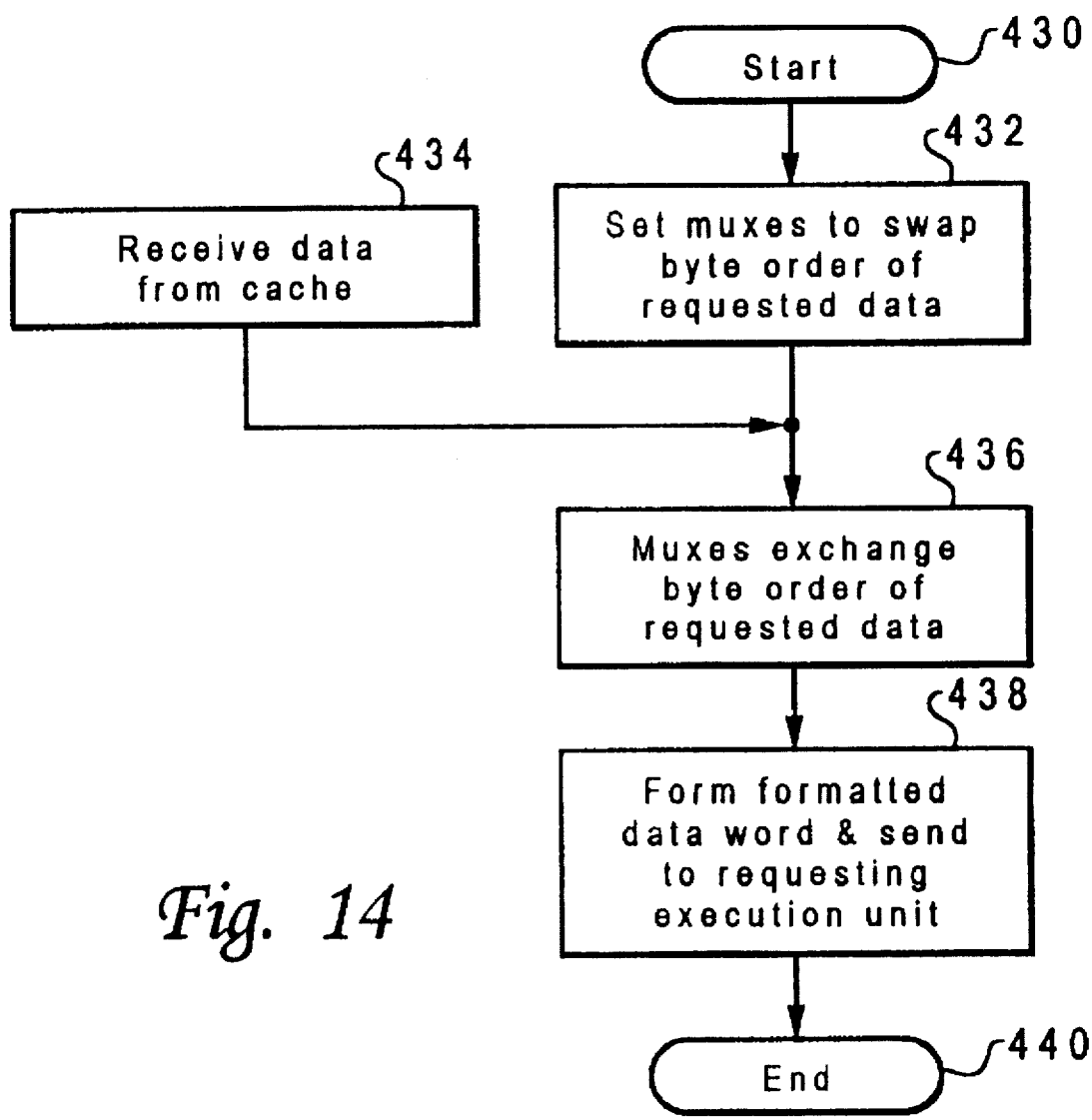
Figure 14:
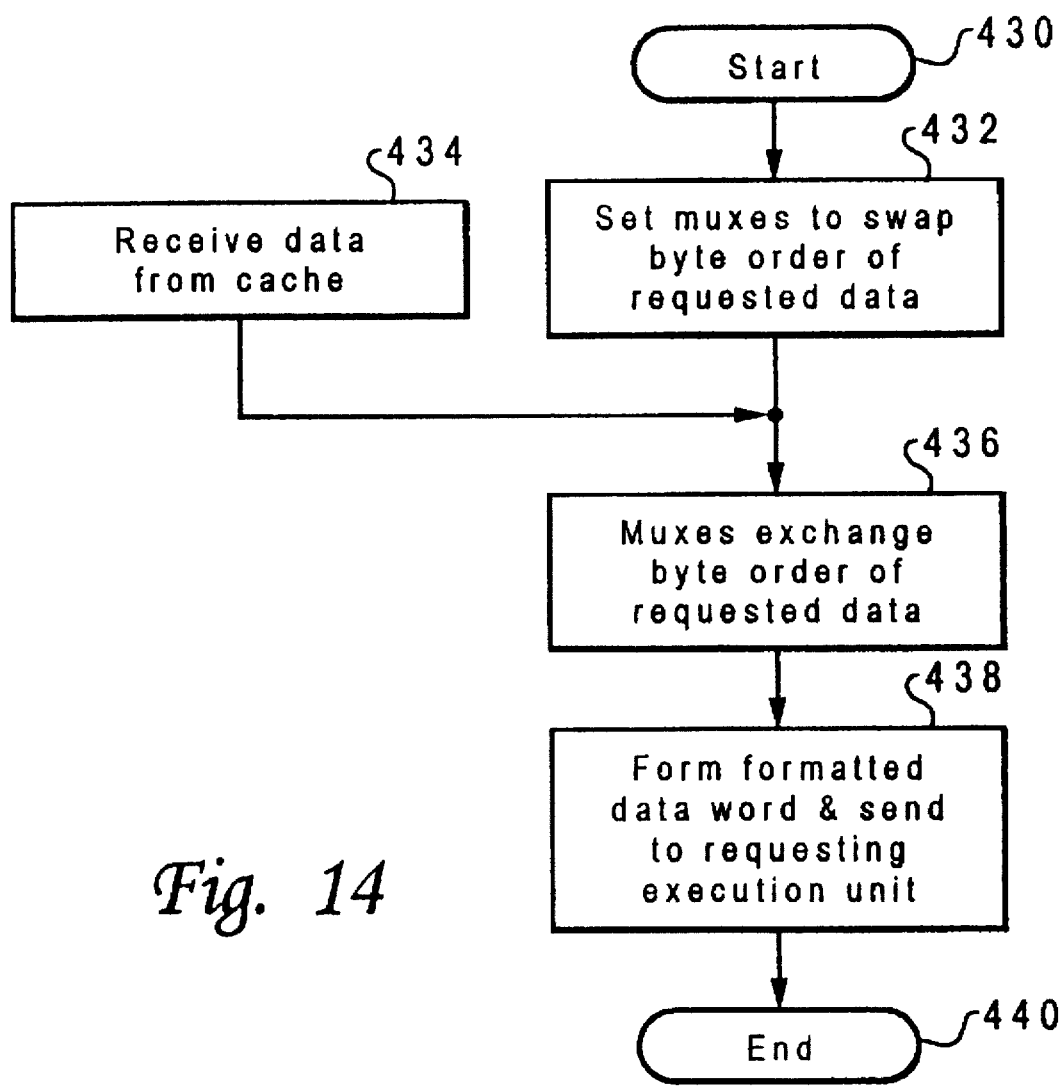

Referring now to FIG. 14, there is depicted a flowchart of a method for recalling data from cache in a big Endian or little Endian format in accordance with the present invention. As depicted at blocks 432 and 434, the data is retrieved from memory array 152 as multiplexers 172 and 176 within formatters 156 are configured to swap the byte order of the requested data. Next, as illustrated at block 436, formatters 156 form an 8-byte output data word by selecting particular bits from the data words read out from memory array 152. The bits are selected such that the byte order of the requested data within formatted data word 165 is reversed with respect to the byte order of the requested data within main memory. Formatted data word 165 is then sent to execution unit 166, as depicted at block 438. Thereafter, the process terminates at block 440.

Figure 15:
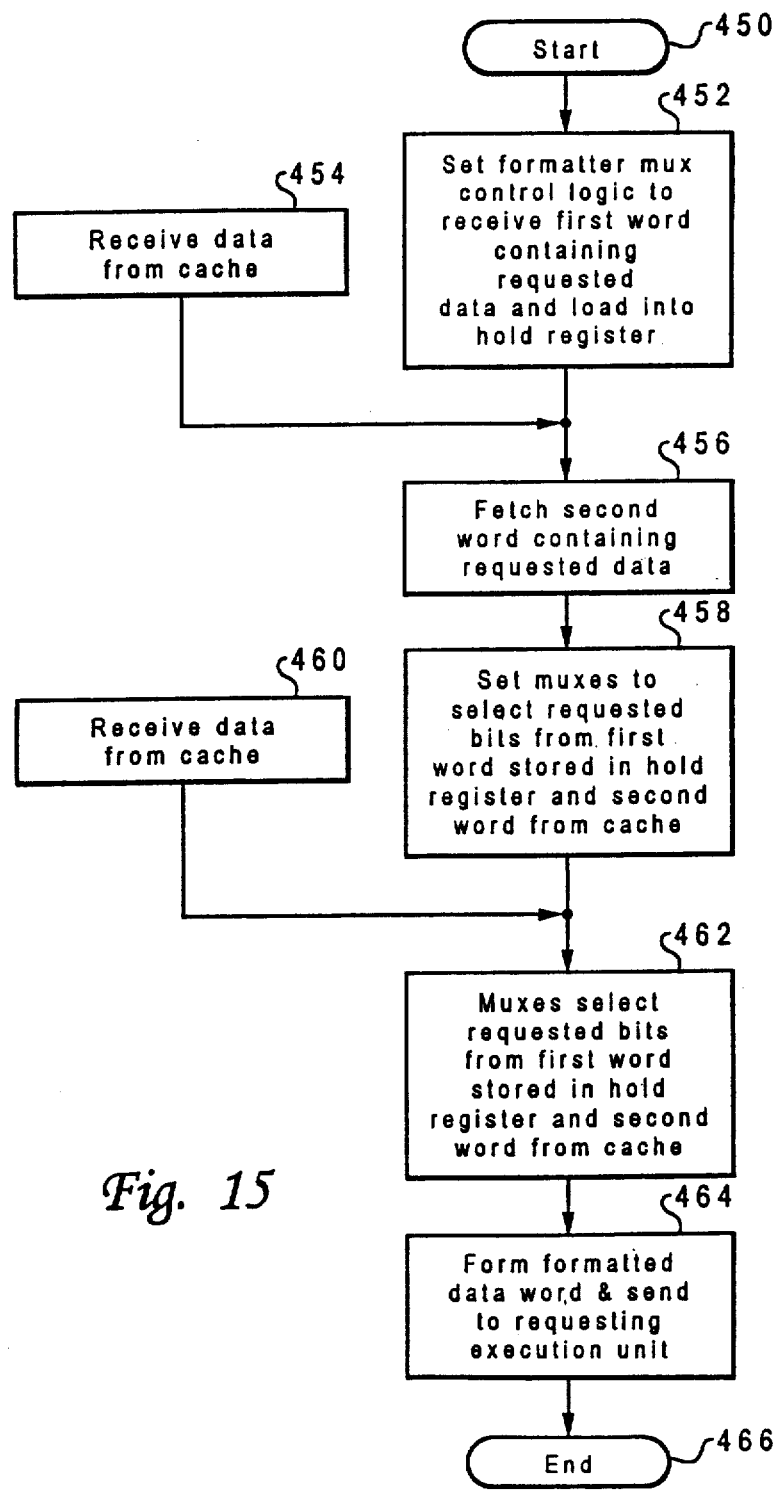

With reference now to FIG. 15, there is depicted a flowchart illustrating a method for recalling aligned data in accordance with the method and system of the present invention. In particular, FIG. 15 depicts a process for aligning data that straddles a doubleword boundary on a doubleword boundary. As illustrated, the process begins at block 450 and thereafter passes to block 452. Block 452 depicts configuring multiplexers 172 and 176 within formatters 156 to receive a first data word containing requested data from memory array 152 and to load the first data word into a hold register 180. As illustrated at block 454, the first data word is retrieved from memory array 152 while formatter MUX control logic 158 configures formatter array 155. Once the first data word is received from memory array 152, the first data word is temporarily stored within hold register 180. The process then proceeds from block 452 to block 456, which illustrates fetching a second data word from memory array 152 that contains requested data.

Next, at block 458, multiplexers 172 and 176 are set to select particular bits from the first data word stored in hold register 180 and particular bits from the second data word which will be received from memory array 152. As has been described, access of the second data word from memory array 152 is performed concurrently with the configuration of formatter array 155 in order to reduce latency, as depicted at block 454. The process then proceeds from block 458 to block 460, which illustrates multiplexers 172 and 176 within formatters 156 selecting particular bits from the first word stored in hold register 180 and particular bits within the second data word retrieved from memory array 152 in order to form an 8-byte output data word. If additional unaligned data is requested, for example, if a load operation of an unaligned string is being performed, the second word may be held in hold register 180 for merging with a subsequently retrieved third data word. Next, formatted data word 165 is formed from the output data word and sent to execution unit 166, as illustrated at block 464. For example, if the requested data comprise 4 bytes that straddle a doubleword boundary, the four MSBs of 8-byte formatted data word 165 are padded with zeros and the 4 LSBs contain the requested data. Thereafter, the process terminates at block 466. As will be appreciated by those skilled in the art, because data straddling a doubleword boundary requires two distinct fetches (and two multiplexer configurations) in the described embodiment, recalling and formatting data misaligned across a doubleword boundary requires two cycles rather than a one.

As has been described, the method and system of the present invention have several advantages, including the reduction or elimination of duplicate formatting circuitry within each execution unit. Another advantage of the present invention is that data is typically formatted in many, if not all, requested formats within the same cycle that data is retrieved from cache. Thus, additional cycle time is typically not required in the execution unit to place the data in the required format before the execution unit begins executing an instruction. Those persons skilled in the art should recognize that the multiplexer configuration shown in formatter 156 of FIG. 6 is versatile, and may provide data in additional formats not discussed with reference to the embodiment described above.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method with a data processing system for storing data in a cache memory and retrieving data from a cache memory in a selected one of multiple data formats, said method comprising the steps of:

selecting data bits from an L-byte data word to produce N input words, each having m bits;

storing each of said N input words within said cache memory;

in response to receipt of a request for data within said L-byte data word having a selected one of said multiple data formats:

recalling said N input words from said cache memory; and simultaneously formatting said N input words to produce a P-byte formatted data word, wherein said P-byte formatted data word is efficiently retrieved from said cache memory and formatted according to said selected one of said multiple data formats before being utilized in said data processing system.

2. The method for storing data and retrieving data in a selected data format of claim 1, said cache memory including N sub-arrays, wherein said step of storing each of said N input words within said cache memory comprises storing each of said N input words within one of said N sub-arrays.

3. The method for storing data and retrieving data in a selected data format of claim 1, said data processing system further including one or more data formatters coupled to said cache memory for formatting data recalled from said cache memory, said method further comprising the step of:

configuring said one or more data formatters in accordance with said selected data format.

4. The method for storing data and retrieving data in a selected data format of claim 3, wherein said configuring step and said recalling step are performed concurrently.

5. The method for storing data and retrieving data in a selected data format of claim 4, wherein said formatting step comprises:

selecting bits, including at least one bit within said N input words, utilizing said one or more formatters to form N output words, each having Q bits; and selecting bits within said N output words to produce said P-byte formatted data word.

6. The method for storing data and retrieving data in a selected data format of claim 5, wherein said step of selecting data bits within said N output words to produce said P-byte formatted data word comprises:

forming said P-byte formatted data word by selecting bit i from output byte j of said N output words as bit j of byte i of said P-byte formatted data word.

7. The method for storing data and retrieving data in a selected data format of claim 1, wherein said step of selecting data bits from an L-byte data word to produce N input data words comprises:

forming each input data word T among said N input data words by concatenating bit T from each byte of said L-byte data word.

8. The method for storing data and retrieving data in a selected data format of claim 1, wherein said request for formatted data comprises a request for right justified data having bits more significant than a most significant bit set to zero.

9. The method for storing data and retrieving data in a selected data format of claim 1, wherein said request for formatted data comprises a request for sign extended data.

10. The method for storing data and retrieving data in a selected data format of claim 1, wherein said request for formatted data comprises a request for data having a selected byte order.

11. The method for storing data and retrieving data in a selected data format of claim 1, wherein said request for formatted data comprises a request for data aligned with a particular data boundary.

12. A data processing system for storing data in a cache memory and retrieving data from said cache memory in a selected one of multiple data formats, said data processing system comprising: an input formatter located in an input data path coupled to said cache memory for selecting data bits from an L-byte data word to produce N input words, each having m bits; means for storing each of said N input words within said cache memory;

responsive to receipt of a request for data within said L-byte data word having a selected one of said multiple data formats:

means for recalling said N input words from said cache memory; and means for simultaneously formatting said N input words to produce a P-byte formatted data word, wherein said P-byte formatted data word is efficiently retrieved from said cache memory and formatted according to said selected one of said multiple data formats before being utilized in said data processing system.

13. The data processing system for storing data and retrieving data in a selected data format of claim 12, said cache memory including N sub-arrays, wherein said means for storing each of said N input words within said cache memory comprises means for storing each of said N input words within one of said N sub-arrays.

14. The data processing system for storing data and retrieving data in a selected data format of claim 12, said data processing system further including one or more data formatters coupled to said cache memory for formatting data recalled from said cache memory, said data processing system further comprising:

means for configuring said one or more data formatters in accordance with said selected data format.

15. The data processing system for storing data and retrieving data in a selected data format of claim 14, wherein said means for configuring and said means for recalling are concurrently operative.

16. The data processing system for storing data and retrieving data in a selected data format of claim 15, wherein said means for formatting comprises:

means for selecting bits, including at least one bit within said N input words, utilizing said one or more formatters to form N output words, each having Q bits; and means for selecting bits within said N output words to produce said P-byte formatted data word.

17. The data processing system for storing data and retrieving data in a selected data format of claim 16, wherein said means for selecting data bits within said N output words to produce said P-byte formatted data word comprises:

means for forming said P-byte formatted data word by selecting bit i from output byte j of said N output words as bit j of byte i of said P-byte formatted data word.

18. The data processing system for storing data and retrieving data in a selected data format of claim 12, wherein said input formatter comprises:

means for forming each input data word T among said N input data words by concatenating bit T from each byte of said L-byte data word.

19. The data processing system for storing data and retrieving data in a selected data format of claim 12, wherein said request for formatted data comprises a request for right justified data having bits more significant than a most significant bit set to zero.

20. The data processing system for storing data and retrieving data in a selected data format of claim 12, wherein said request for formatted data comprises a request for sign extended data.

21. The data processing system for storing data and retrieving data in a selected data format of claim 12, wherein said request for formatted data comprises a request for data having a selected byte order.

22. The data processing system for storing data and retrieving data in a selected data format of claim 12, wherein said request for formatted data comprises a request for data aligned with a particular data boundary.

* * * * *

UNITED STATES PATENT AND TRADEMARK OFFICE
CERTIFICATE OF CORRECTION

PATENT NO. : 5,721,957  Page 1 of 2
DATED : February 24, 1998
INVENTOR(S) : Huang et al.

It is certified that error appears in the above-identified patent and that said Letters Patent is hereby corrected as shown below:

In the Drawings:

Insert Figure 15, should be Sheet 14 of 14. Figure 14 was duplicated.

In the Attorney, Agent or Firm Section:

Change "Brain" to --Brian--.

Signed and Sealed this

Fourteenth Day of July, 1998

Attest:

BRUCE LEHMAN

Attesting Officer  Commissioner of Patents and Trademarks